US012080194B1

(12) United States Patent
Drummond

(10) Patent No.: US 12,080,194 B1
(45) Date of Patent: Sep. 3, 2024

(54) RECYCLABLE SIGNAGE

(71) Applicant: Packrite, LLC, High Point, NC (US)

(72) Inventor: Michael R. Drummond, High Point, NC (US)

(73) Assignee: Packrite, LLC, High Point, NC (US)

( * ) Notice: Subject to any disclaimer, the term of this patent is extended or adjusted under 35 U.S.C. 154(b) by 274 days.

(21) Appl. No.: 16/882,867

(22) Filed: May 26, 2020

Related U.S. Application Data

(63) Continuation of application No. 15/897,304, filed on Feb. 15, 2018, now abandoned.

(60) Provisional application No. 62/459,779, filed on Feb. 16, 2017.

(51) Int. Cl.

| | |
|---|---|
| ***G09F 7/00*** | (2006.01) |
| ***B31F 1/28*** | (2006.01) |
| ***B31F 5/04*** | (2006.01) |
| ***G09F 3/02*** | (2006.01) |
| ***G09F 3/10*** | (2006.01) |

(52) U.S. Cl.
CPC .............. *G09F 7/002* (2013.01); *B31F 1/285* (2013.01); *B31F 1/2863* (2013.01); *B31F 5/04* (2013.01); *G09F 3/02* (2013.01); *G09F 3/10* (2013.01); *G09F 2003/0223* (2013.01)

(58) Field of Classification Search
CPC ..... G09F 7/002; G09F 3/02; G09F 2003/0223
USPC ..................... 524/290, 354; 428/182; 40/584
See application file for complete search history.

(56) References Cited

U.S. PATENT DOCUMENTS

| | | | | |
|---|---|---|---|---|
| 3,700,611 A * | 10/1972 | Nickerson | C09J 131/04 | 524/46 |
| 3,769,151 A * | 10/1973 | Knutson | C08F 261/04 | 524/459 |
| 4,587,332 A * | 5/1986 | Lane | C08B 30/12 | 106/206.1 |
| 4,814,039 A * | 3/1989 | Willging | D21H 27/32 | 524/592 |
| 5,750,237 A * | 5/1998 | Allin | B32B 5/18 | 428/514 |
| 6,066,379 A * | 5/2000 | Ma | D21H 19/58 | 428/199 |
| 6,170,183 B1 * | 1/2001 | Keefe | G09F 15/0006 | 248/156 |
| 2003/0211292 A1* | 11/2003 | Malone | B32B 29/08 | 428/182 |
| 2006/0117625 A1* | 6/2006 | Peterson | G09F 7/22 | 40/611.01 |
| 2010/0189961 A1* | 7/2010 | Bugas | B29D 29/00 | 156/278 |
| 2014/0093705 A1* | 4/2014 | Shi | D21H 27/10 | 428/182 |

FOREIGN PATENT DOCUMENTS

EP 0191460 A2 * 2/1986

* cited by examiner

*Primary Examiner* — Gary C Hoge
(74) *Attorney, Agent, or Firm* — MacCord Mason PLLC

(57) ABSTRACT

Manufacturing signage assemblies, systems, and devices are shown and described. Recyclable signage intended for outdoor use may include a medium with a coated unactivated striped front and rear face, an adjacent liner sheet, and wherein the fluted medium and the liner are adhered with an adhesive to form the signage.

3 Claims, 18 Drawing Sheets

RECYCLABLE SIGNAGE

This application is a Continuation of U.S. application Ser. No. 15/897,304, filed Feb. 15, 2018, which claims the benefit of US Provisional Application No. 62/459,779, filed Feb. 16, 2017, which is incorporated herein by reference in its entirety.

FIELD OF THE TECHNOLOGY

The present disclosure relates generally to signage, and more particularly to improved methods, processes, and assemblies for manufacturing multi-layered composite recyclable signage with increased sustainability.

BACKGROUND

Classical methods for creating outdoor signage typically incorporate plastics to provide characteristics to withstand various weather conditions, such as humidity, rain, or wind. One drawback of plastic outdoor signs is the inefficiency, or even inability, for recycling after use. Another disadvantage with conventional plastic systems and methods is higher expense, particularly in the signage industry, where single-use signage is very cost-sensitive.

Conventional corrugated systems and methods fail to provide these desired attributes of outdoor recyclable signage. Corrugated mediums alone are typically not weatherproof, and therefore, are not suitable for a variety of outdoor use. Current methods for weatherproofing corrugated mediums render these systems unrecyclable, particular products with wax coating applications. Moreover, certain linerboards require clay coatings to print graphics onto the signage, which impact printing/imaging capabilities and increases product costs.

Therefore, Applicant desires systems and methods for sustainable and cost-efficient recyclable outdoor signage, with maintaining standards for reliable and accurate printing, but without the drawbacks presented by the traditional production and methods.

SUMMARY

In accordance with the present disclosure, recyclable signage are provided for a wide variety of marketing, advertising, organization efforts, and the like. This disclosure provides improved layered outdoor signage, which are sustaining, convenient, efficient, and environmentally-friendly.

In one embodiment, a layered recyclable outdoor signage comprises a fluted corrugated medium layer having a plurality of ridges with a first side and a second side, said first side defining crests at said peaks of said plurality of ridges, said second side defining troughs between the plurality of ridges; a first layer liner adjacent said corrugated medium and having an inner face and an outer face, said inner face comprising a fully activated surface and said outer face comprising a supercobb moisture and oil barrier coating; a polyvinyl acetate adhesive binding said first layer liner's inner face about said corrugated medium's crests; a second layer liner adjacent said corrugated medium and having an inner face and an outer face, said inner face comprising a fully activated surface and said outer face comprising a supercobb moisture and oil barrier coating; and a starch adhesive binding said second layer liner's inner face about said corrugated medium's troughs, and wherein said layered signage being a fully recyclable, corrugated supported outdoor signage comprising two opposing printable exterior surfaces.

In one example, the fluted corrugated medium includes a flute size selected from the group consisting of a B, C, and E flute. The first layer liner may include a printed graphic. The first layer liner graphic may extend substantially between a perimeter of said signage. The outer face of said first layer liner may include an anti-slip agent. The polyvinyl acetate adhesive may include about 8.9 lb-mas/gal. The polyvinyl acetate adhesive may include about 0.1 to about 1 percent by volume vinyl acetate, about 0.1 to about 1 percent by volume glyoxal, and about 1 to about 5 percent by volume 2-(20ethoxyethoxy) ethyl acetate. The polyvinyl acetate adhesive may include at least one additive. The second layer liner may include a printed graphic. For instance, the second layer liner graphic may extend substantially between a perimeter of said signage.

In certain examples, the outer face of said second layer liner includes an anti-slip agent. The starch adhesive may include a carbohydrate blend. The starch adhesive may include a ketone-aldehyde resin. The starch adhesive may include a penetrant surfactant. Further, the opposing printable exterior surfaces receive print being free of a clay coating.

In one embodiment, a layered outdoor signage comprises a corrugated medium having a plurality of ridges; a first layer liner adjacent said corrugated medium, wherein said first layer liner having a moisture barrier and a graphic print; a polyvinyl acetate adhesive binding said first layer liner and said corrugated medium; a second layer liner adjacent said corrugated medium, wherein said second layer liner having a moisture barrier and a graphic print; and a starch adhesive binding said second layer liner and said corrugated medium.

In one example, the signage may be repulpable and recyclable. The signage may include two opposing printable exterior surfaces. The corrugated medium may include a flute size selected from the group consisting of a B, C, and E flute.

In one embodiment, a layered recyclable outdoor signage comprises a fluted corrugated medium having a plurality of crests and peaks; a first layer liner adjacent said corrugated medium and having an inner face and an outer face, said inner face comprising a fully activated surface and said outer face comprising a moisture barrier coating; a polyvinyl acetate adhesive binding said first layer liner's inner face about said corrugated medium's crests; a second layer liner adjacent said corrugated medium and having an inner face and an outer face, said inner face comprising a fully activated surface and said outer face comprising a moisture barrier coating; and a starch adhesive binding said second layer liner's inner face about said corrugated medium's troughs, and wherein said starch adhesive comprises a carbohydrate blend, a ketone-aldehyde resin, and a penetrant surfactant.

In one embodiment of the present disclosure, a method of assembling a recyclable signage having a corrugated support includes conveying a medium comprising a coated unactivated striped front face and an opposing coated unactivated striped rear face along a first longitudinal direction; conveying the medium through a corrugator, wherein the corrougator comprising a pair of heated drums concurrently heating and activating the stripes and crimping the medium thereby defining a corrugated barrier; generating a plurality of flute tips along the medium to define a fluted medium; activating unactivated stripes and creating a full wrap by conveying the medium around a secondary heated drum;

conveying a liner sheet along an asitrade in a direction adjacent the medium, wherein the liner sheet having elements chosen from the group comprising of activated elements and unactivated elements on a front side, and activated elements and unactivated elements on a rear side; and adhering the fluted medium and the liner with an adhesive along peaks and ridges of the fluted medium for generating a layered recyclable outdoor signage.

In one example, the method includes heating the striped faces and penetrating coating in-between the stripes. Further, the method may include printing a graphic on the layered recyclable outdoor signage.

In certain examples, the outdoor recyclable fluted medium may have a plurality of ridges with a first side and a second side, the first side defining crests at the peaks of the plurality of ridges, the second side defining troughs between the ridges. In addition, the liner may have an inner face and an outer face and the adhesive binding the inner face of the top liner about crests of the medium.

In yet another embodiment of the disclosure, a method of assembling a recyclable signage having a corrugated support includes conveying a medium comprising a coated unactivated striped front face and an opposing coated unactivated striped rear face along a longitudinal direction; conveying the medium through a corrugator, wherein the corrogator comprising a pair of heated drums concurrently heating and activating the stripes and crimping the medium thereby defining a barrier; generating a plurality of flute tips along the medium to define a fluted medium; conveying the medium around a secondary heated drum for activating unactivated stripes and creating a full wrap; conveying a liner sheet along an asitrade in a direction adjacent the medium, wherein the liner sheet having elements chosen from the group consisting of activated elements and unactivated elements on a front side, and activated elements and unactivated elements on a rear side; and adhering the fluted medium and the liner with a starch adhesive along peaks and ridges of the fluted medium to generate the layered recyclable signage.

In some examples, the method includes conveying the medium through an asitrade heating between about one hundred and seventy degrees to about one hundred and eighty degrees. The method may include heating the stripes and penetrating coating in-between the stripes. The method may include enclosing the penetrated stripes. The coating may be devoid of activation until concurrently heating and activating the stripes. The method may include compressing the medium, the liner, and the adhesive. The medium may have a bleached sheet and coated prior to activating the stripes. The coated medium may have a plurality of heat-activated coatings, for instance for water repellant characteristics. The method may include coating the medium prior to adhering the medium with the liner sheet. The method may include coating the liner sheet prior to adhering the medium with the liner sheet.

In another embodiment, a method of assembling a recyclable signage having a corrugated support includes conveying a medium comprising a coated unactivated striped front face and on an opposing coated unactivated striped rear face along a longitudinal direction; conveying the medium through a corrugator, wherein the corrugator comprising a pair of heated drums concurrently heating and activating the stripes and crimping the medium thereby defining a barrier; generating a plurality of flute tips along the medium to define a fluted medium; conveying the medium around a secondary heated drum for activating unactivated stripes and creating a full wrap; conveying a liner sheet along an asitrade in a direction adjacent the medium, wherein the liner sheet has activated elements and unactivated elements on a front side, and activated elements and unactivated elements on a rear side; adhering the fluted medium and the liner with a starch adhesive along peaks and ridges of the fluted medium to generate the layered recyclable outdoor signage.

In some examples, the method includes conveying the medium through an asitrade heating between about one hundred and seventy degrees to about one hundred and eighty degrees. Similarly, the method may include conveying the liner sheet through an asitrade heating between about one hundred and fifty degrees to about one hundred and sixty degrees.

In particular examples, the process may include heating the stripes and penetrating coating in-between the stripes. Further, the process may include enclosing the penetrated stripes. Typically, the coating is not activated until concurrently heating and activating the stripes. The process may include compressing the medium, the liner, and the adhesive. In addition, the process may include aligning a die cutter, or the like, and cutting the medium, the liner, and an adhesive.

In certain examples, the process may include stacking the medium, the liner, and an adhesive. The medium may comprise a bleached sheet and coated prior to activating the stripes. The coated medium may comprise a plurality of heat-activated coatings adapted for water repellant characteristics. The medium may be coated prior to adhering the medium with the liner sheet. The liner sheet may be coated prior to adhering the medium with the liner sheet. The liner sheet may be an activated element on a front side. The liner sheet includes an unactivated element on a front side. The liner sheet may include an activated element on a rear side. The liner sheet may include an unactivated element on a rear side. The recyclable outdoor signage may have a flute size selected from the group comprising B, C and E flute. The recyclable outdoor sign have a Cobb value up to about 100 $g/m^2$. The recyclable outdoor sign may have a unique Cobb value.

In some examples, the adhesive includes at least one additive. The adhesive may be a corn starch. The process may include printing a graphic. The printing may be positioned an outer face of the signage free of a clay coating. The process may include a pre-printing on an offset printer, plain face for a digital printer, and the like.

In another embodiment, a recyclable signage comprises a liner sheet; a corrugated barrier layer activated by heating unactivated coated stripes on a medium and penetrating coating in-between the stripes, and wherein the liner sheet adhered to the liner sheet with a starch adhesive.

In some examples, the medium has a coated unactivated striped front face. The medium may have a coated unactivated striped rear face. The corrugated barrier layer may have a plurality of flute tips. The corrugated barrier layer may have a full wrap. The liner sheet may have activated elements on a front side. The liner sheet may have unactivated elements on a front side. The liner sheet may have activated elements on a rear side. The liner sheet may have unactivated elements on a rear side. The signage may have a substantially weatherproof, wax alternative coating.

In yet another embodiment of the disclosure, a method of assembling a recyclable signage includes concurrently heating a plurality of unactivated stripes on a medium and penetrating coating within the stripes; crimping the medium to define an activated fluted medium; and adhering the activated fluted medium to a liner with a starch adhesive.

In some examples, the process may include conveying the medium around a heated drum for activating unactivated stripes. The process may include creating a full wrap. The process may include conveying the liner along an asitrade in a direction adjacent the medium.

Yet another embodiment of the disclosure is a method of assembling a recyclable signage having a corrugated support including conveying a medium comprising a coated unactivated striped front face and on an opposing coated unactivated striped rear face along a longitudinal direction; conveying the medium through a corrugator, wherein the corrugator comprising a pair of heated drums concurrently heating and activating the stripes and crimping the medium thereby defining a barrier; generating a plurality of flute tips along the medium to define a fluted medium; conveying the medium around a secondary heated drum for activating unactivated stripes and creating a full wrap; conveying a liner sheet along an asitrade in a direction adjacent the medium, wherein the liner sheet having elements chosen from the group consisting of activated elements and unactivated elements on a front side, and activated elements and unactivated elements on a rear side; adhering the fluted medium and the liner with a starch adhesive along peaks and ridges of the fluted medium to generate the layered recyclable outdoor signage.

In some examples, the fluted medium has a plurality of ridges with a first side and a second side, the first side defining crests at the peaks of the plurality of ridges, the second side defining troughs between the of ridges. The liner may have an inner face and an outer face and the adhesive binding the inner face of the top liner about crests of the medium. Typically, the signage is recyclable. Further, the signage may have a flute size selected from the group comprising B, C and E flute.

In yet another signage of produced by the disclosure comprises a core layer comprised of a fluted corrugated sheet having a plurality of ridges with a first side and a second side, the first side defining crests at the peaks of the plurality of ridges, the second side defining troughs between the plurality of ridges; a top liner layer having an inner face and an outer face, wherein a first adhesive binds the inner face of the top liner layer about the crests at the first side of the core layer; a bottom liner layer having an inner face and an outer face, wherein a second adhesive binds the inner face of the bottom liner layer about the troughs at the second side of the core layer; and a weatherproof, wax alternative coating on the core layer, the top liner layer, and the bottom liner layer.

In some examples, the first adhesive is polyvinyl alcohol. The second adhesive may be a corn starch. Typically, the signage is recyclable or the like. In some examples, the flute size is selected from the group comprising B, C, and E flute.

Another embodiment of the disclosure is a recyclable outdoor signage having a corrugated support and comprising a fluted corrugated core having a plurality of ridges with a first side and a second side, the first side defining crests at the peaks of the plurality of ridges, the second side defining troughs between the plurality of ridges; a top liner having an inner face and an outer face, wherein a first adhesive binds the top liner's inner face about the core's crests; a bottom liner having an inner face and an outer face, wherein a second adhesive binds the bottom liner's inner face about the core's troughs; and a semi-impermeable coating on opposing faces of the core, the top liner, and the bottom liner.

In particular examples, the semi-impermeable coating comprises a wax alternative. The wax alternative may be FluteShield. The semi-impermeable coating may be applied to the inner face and the outer face of the top liner and to the inner face and the outer face of the bottom liner. Further, the semi-impermeable coating may be applied to the first side and second side of the core layer.

In particular examples, the first adhesive comprises polyvinyl alcohol. Further, the polyvinyl alcohol includes at least one additive.

The second adhesive may comprise corn starch. Further, the corn starch may include at least one additive.

In some examples, the outer face of the signage receives print being free of a clay coating. The signage may include a graphic. The graphic may include at least one solvent-based ink. The top liner and the bottom liner may comprise a magazine stock paper.

Yet another embodiment of the disclosure is a recyclable outdoor signage comprising a core layer comprised of a fluted corrugated sheet having a plurality of ridges with a first side and a second side, the first side defining crests at the peaks of the plurality of ridges, the second side defining troughs between the plurality of ridges; a top liner layer comprised of magazine stock paper, the top liner layer having an inner face and an outer face, the inner face of the top liner layer bound to the crests at the first side of the core layer using a polyvinyl alcohol adhesive, the outer face of the top liner layer including a graphic printed using a solvent-based ink; a bottom liner layer comprised of magazine stock paper, the bottom liner layer having an inner face and an outer face, the inner face of the bottom liner layer bound to the troughs at the second side of the core layer using a corn starch adhesive, the outer face of the bottom liner layer including a graphic printed using a solvent-based ink; and a FluteShield coating applied to the inner face and the outer face of the top liner layer and to the inner face and the outer face of the bottom liner layercore layer, the FluteShield coating forming chemical bonds with the first adhesive and the second adhesive, and wherein the graphic of the top liner layer and the graphic of the bottom liner layer are printed on top of the FluteSield coating without a clay coating.

In some examples, an additional coating of SurfSHIELD™ SuperCobb on the outer face of the top liner layer and the outer face of the bottom liner layer.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
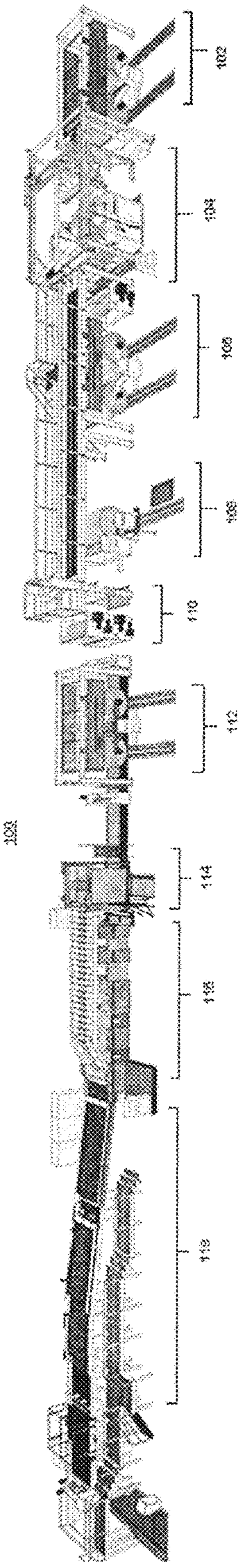
FIG. 1 is a schematic front overview of one embodiment of a process assembly according to the present disclosure.
Figure 1A:
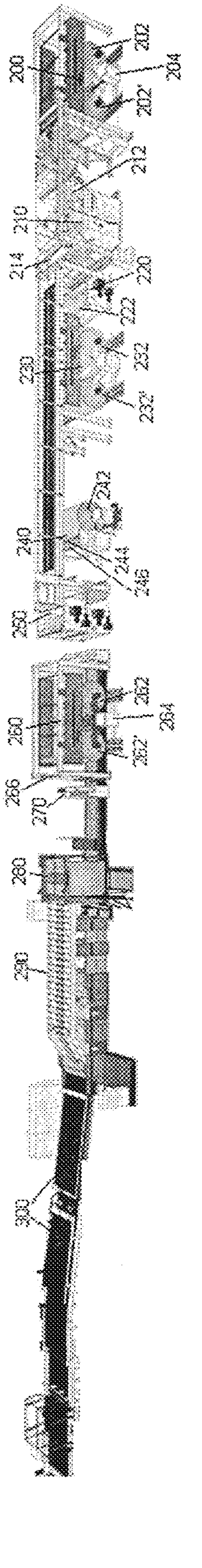
FIG. 1A is a schematic overview of the embodiment introduced in FIG. 1.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any inventions thereto. As best seen in FIGS. 1 and IA, the signage process and masterflute assembly, generally designated 100, are shown embodied according to the present disclosure to assemble and manufacture any of the signage shown and described herein. Applicant has discovered unexpected advantages of the process flow embodiments for critical orientation, activation, and heating procedures. For instance, typical embodiments to produce the unique, recyclable signage include specific manipulations of medium, liner, and adhesives as shown and described herein at wet-end assemblies, pre-print assemblies, central laminating assemblies, and completed in a delivery section assembly.

FIG. 1 is an overview of an in-line laminator comprising process stations to provide any of the signage having the corrugated support shown and described herein. FIGS. 1A-11B introduce useful elements and product flow for the conveying, activating, heating, crimping, and adhering of the mediums, liners, and adhesives.

Figure 2:
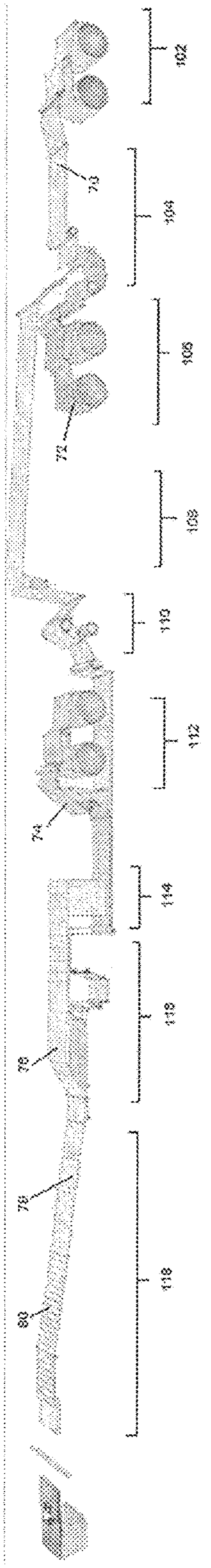
FIG. 2 is schematic product material flow overview along the embodiment introduced in FIG. 1.
Figure 3A:
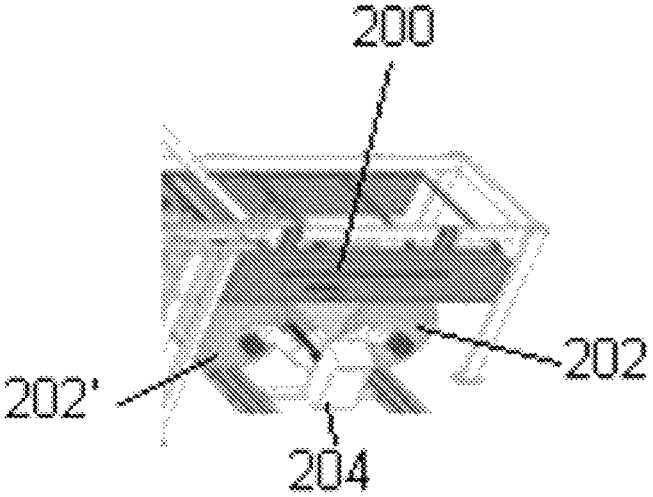
FIGS. 3A and 3B are perspective views of isolated segments shown in FIG. 1.
Figure 3B:
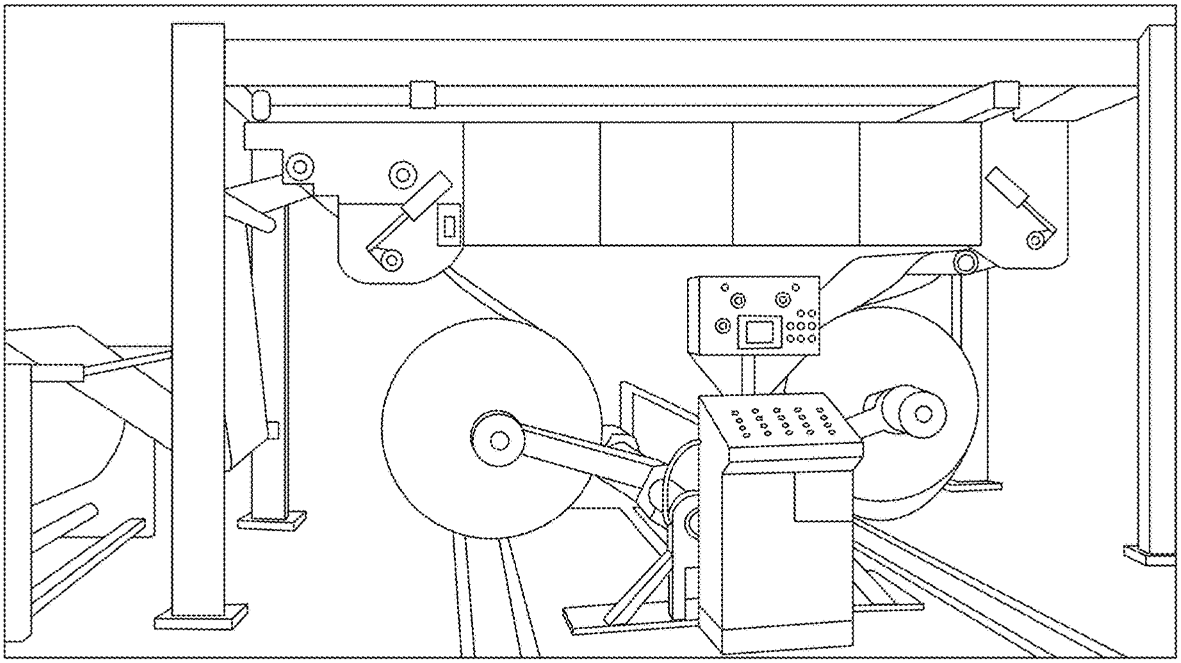
Figure 4A:
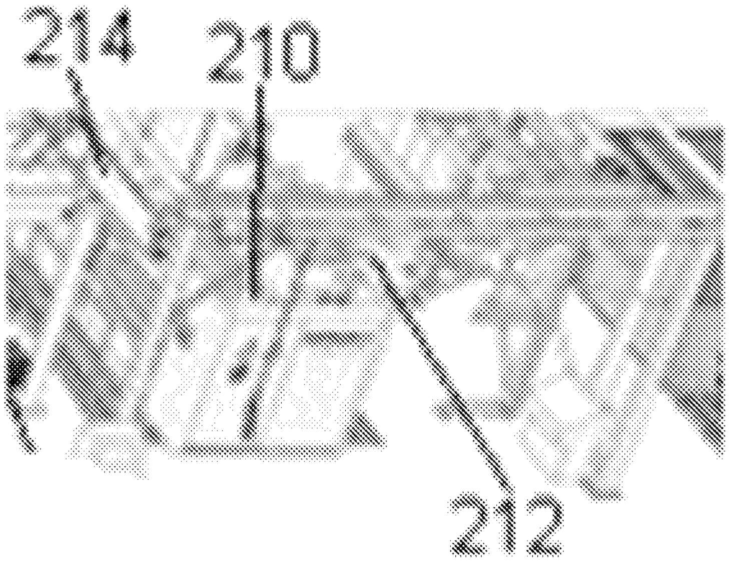
FIGS. 4A and 4B are perspective views of isolated segments shown in FIG. 1.
Figure 4B:
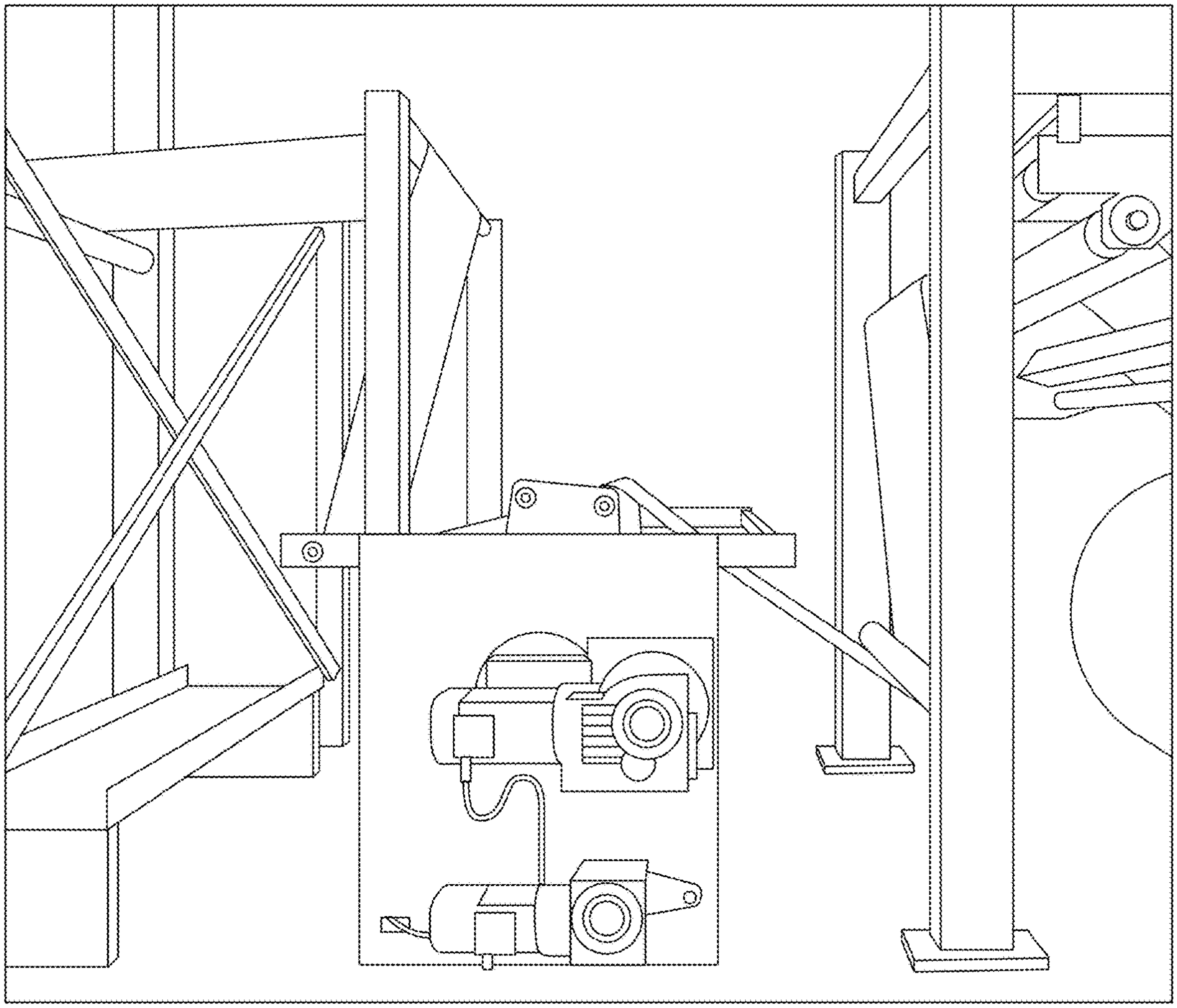
Figure 5A:
FIGS. 5A, 5B, and 5C are perspective views of isolated segments shown in FIG. 1.
Figure 5B:
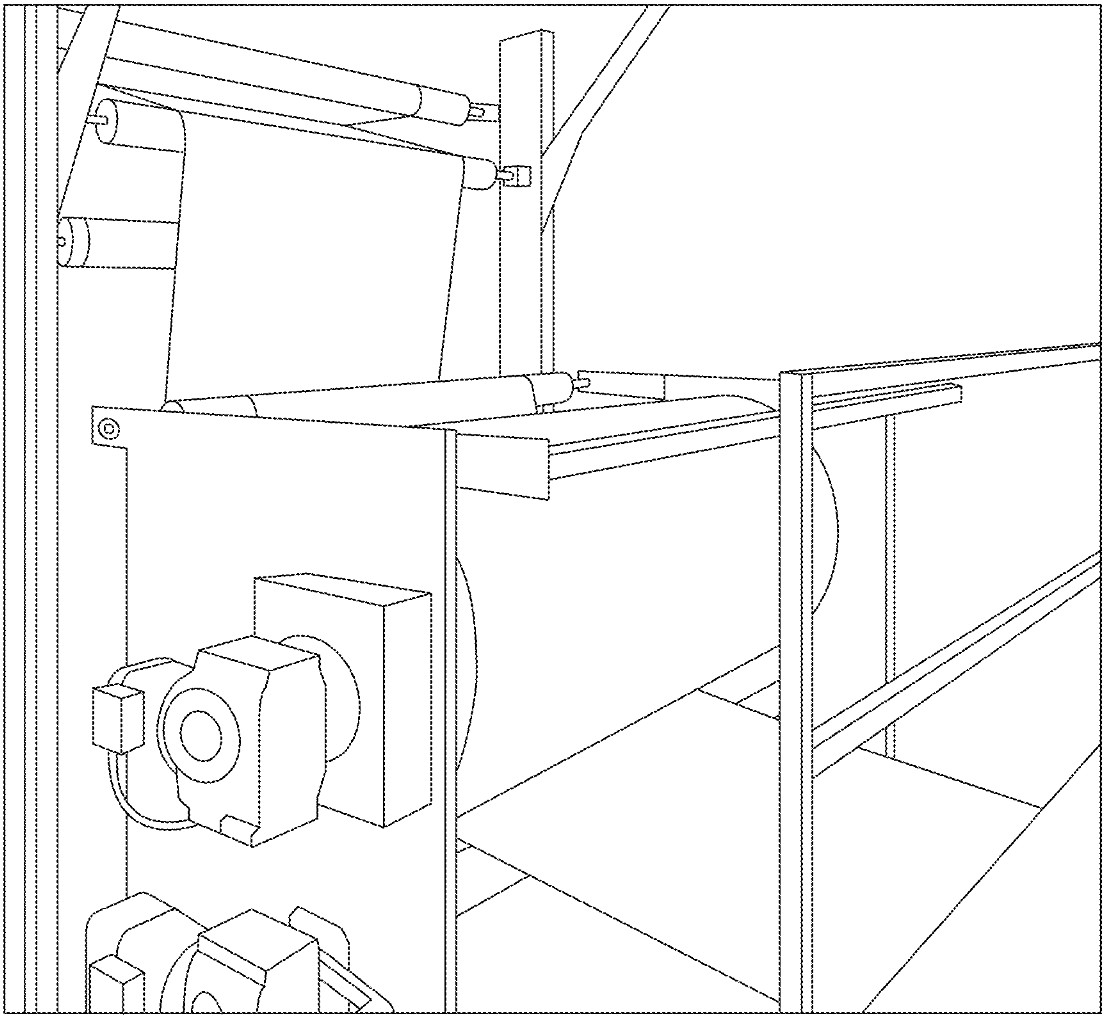
Figure 5C:
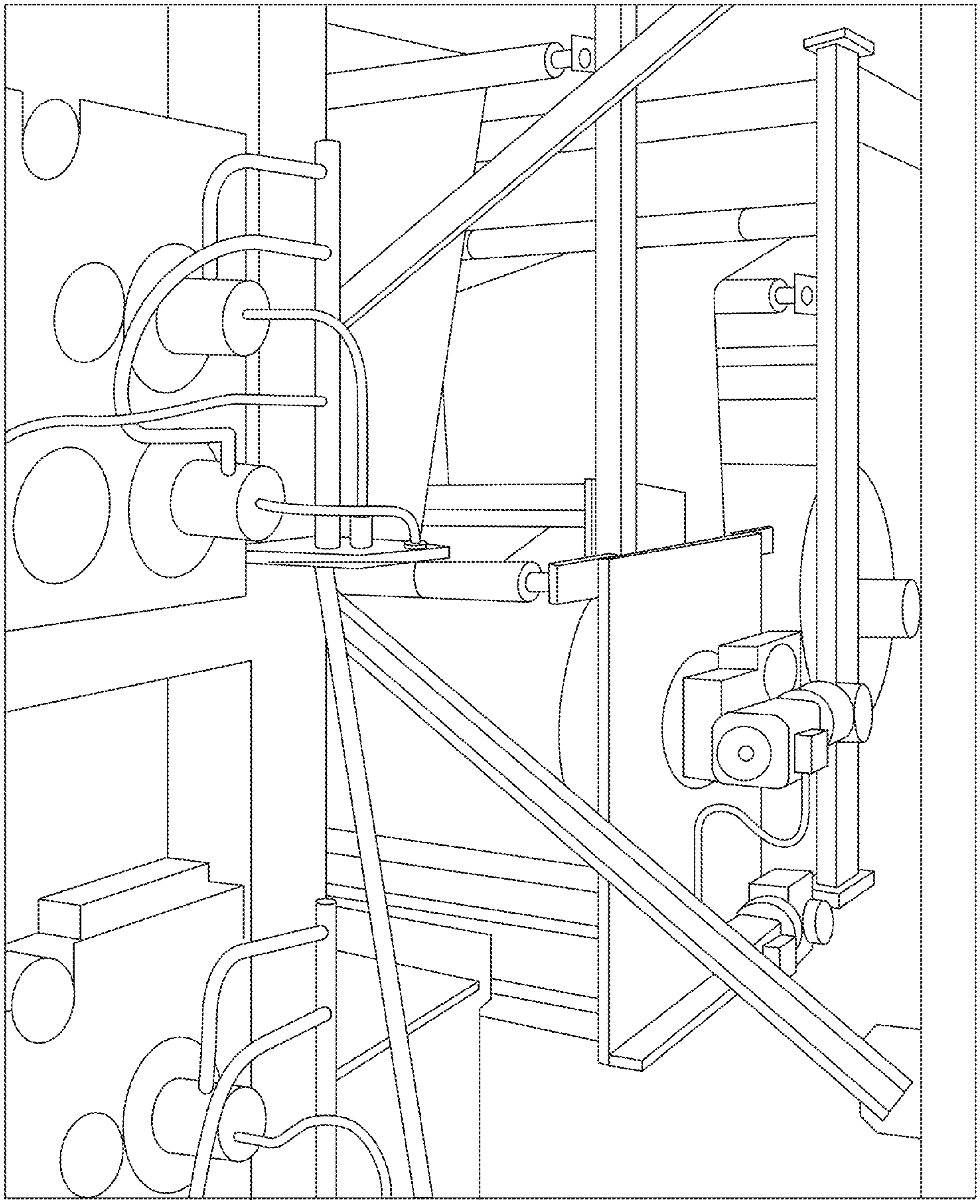
Figure 6:
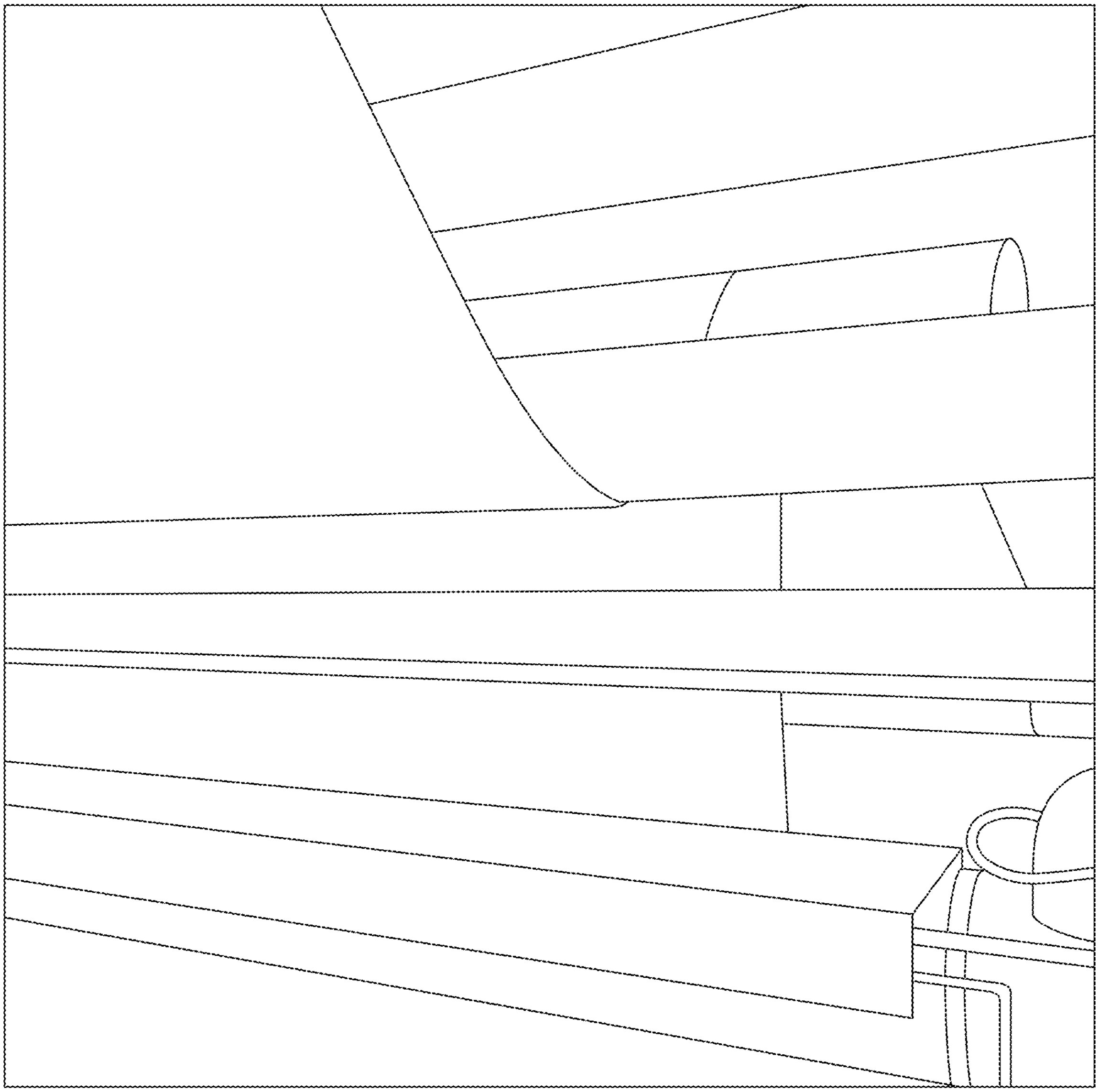
FIG. 6 is a perspective view of isolated segments shown in FIG. 1, showing flute tips creating a fluted medium.
Figure 7:
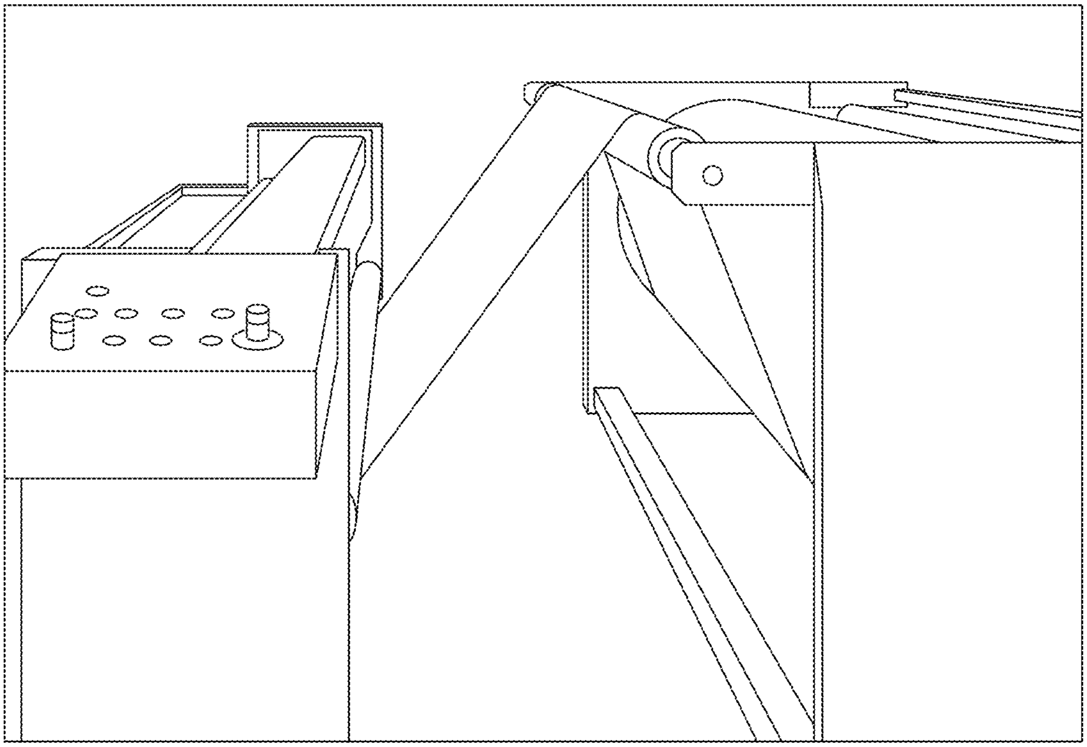
FIG. 7 is a perspective view of isolated segments shown in FIG. 1.
Figure 8:
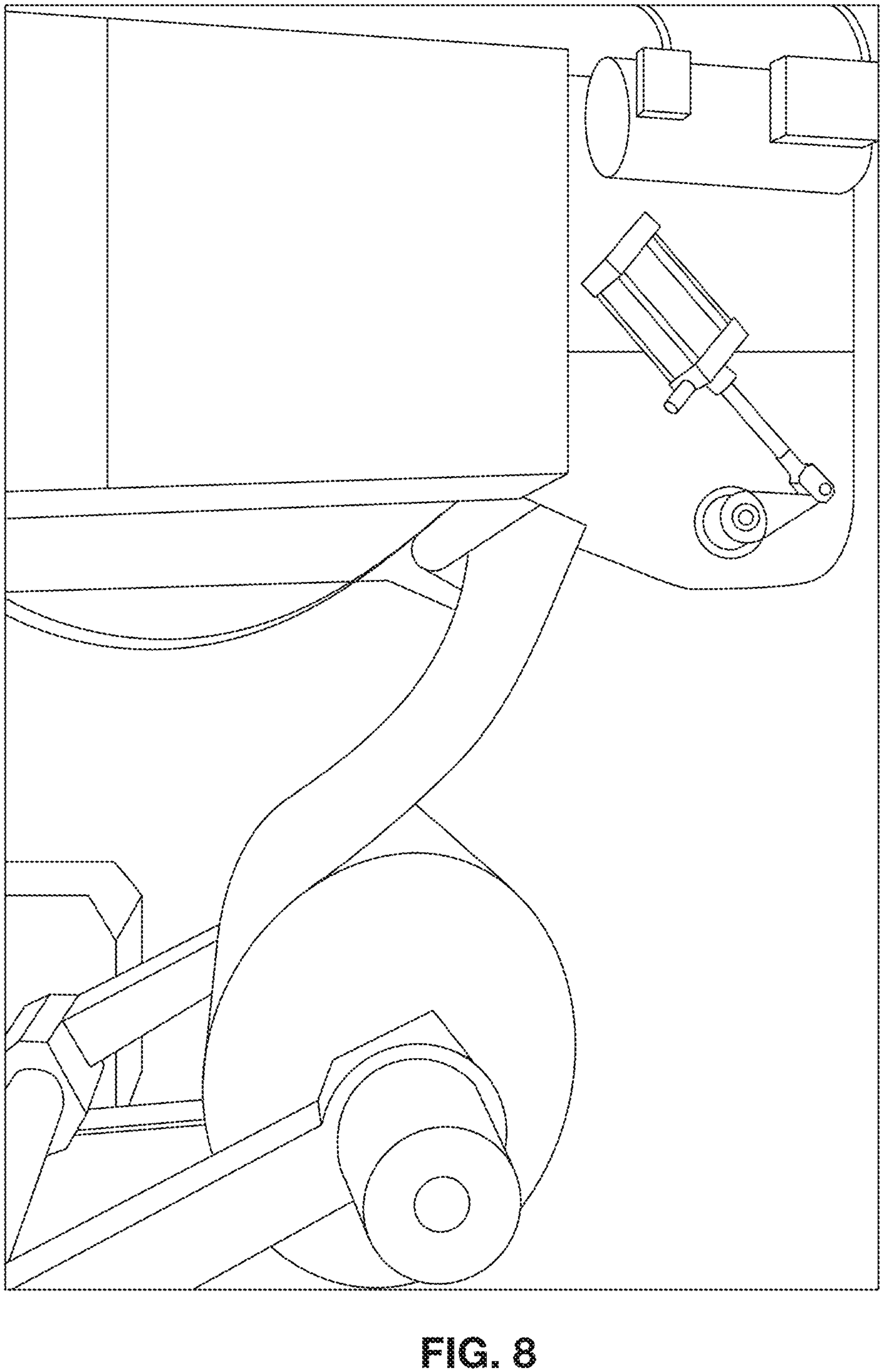
FIG. 8 is a perspective view of isolated segments shown in FIG. 1.
Figure 9:
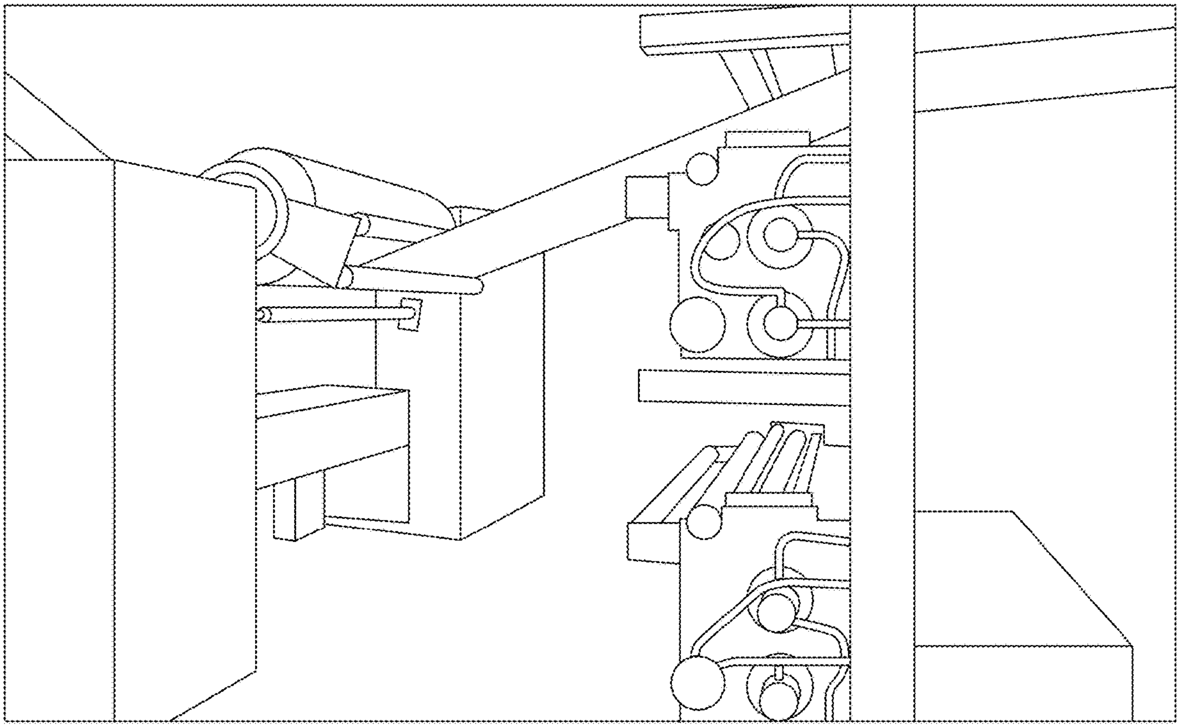
FIG. 9 is a perspective view of isolated segments shown in FIG. 1.
Figure 10:
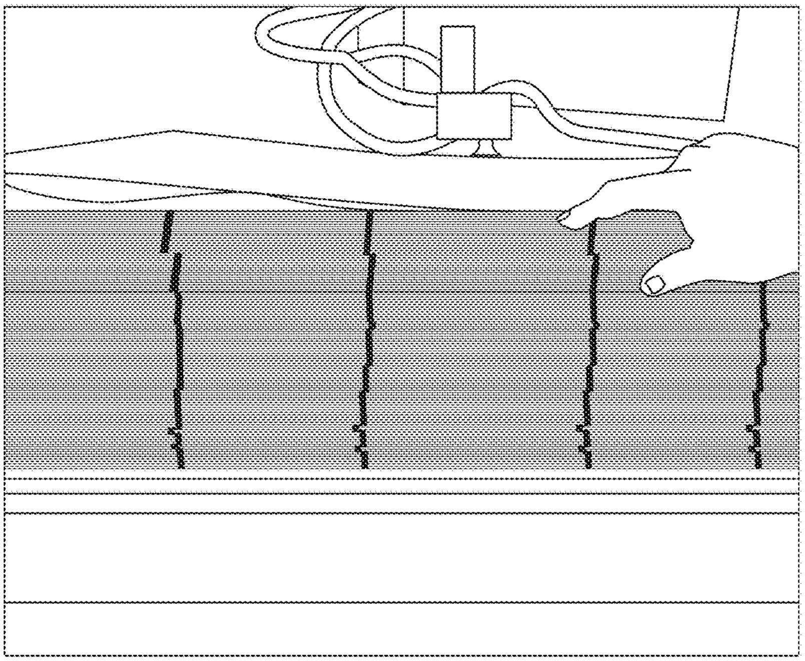
FIG. 10 is a perspective view of isolated segments shown in FIG. 1.
Figure 11A:
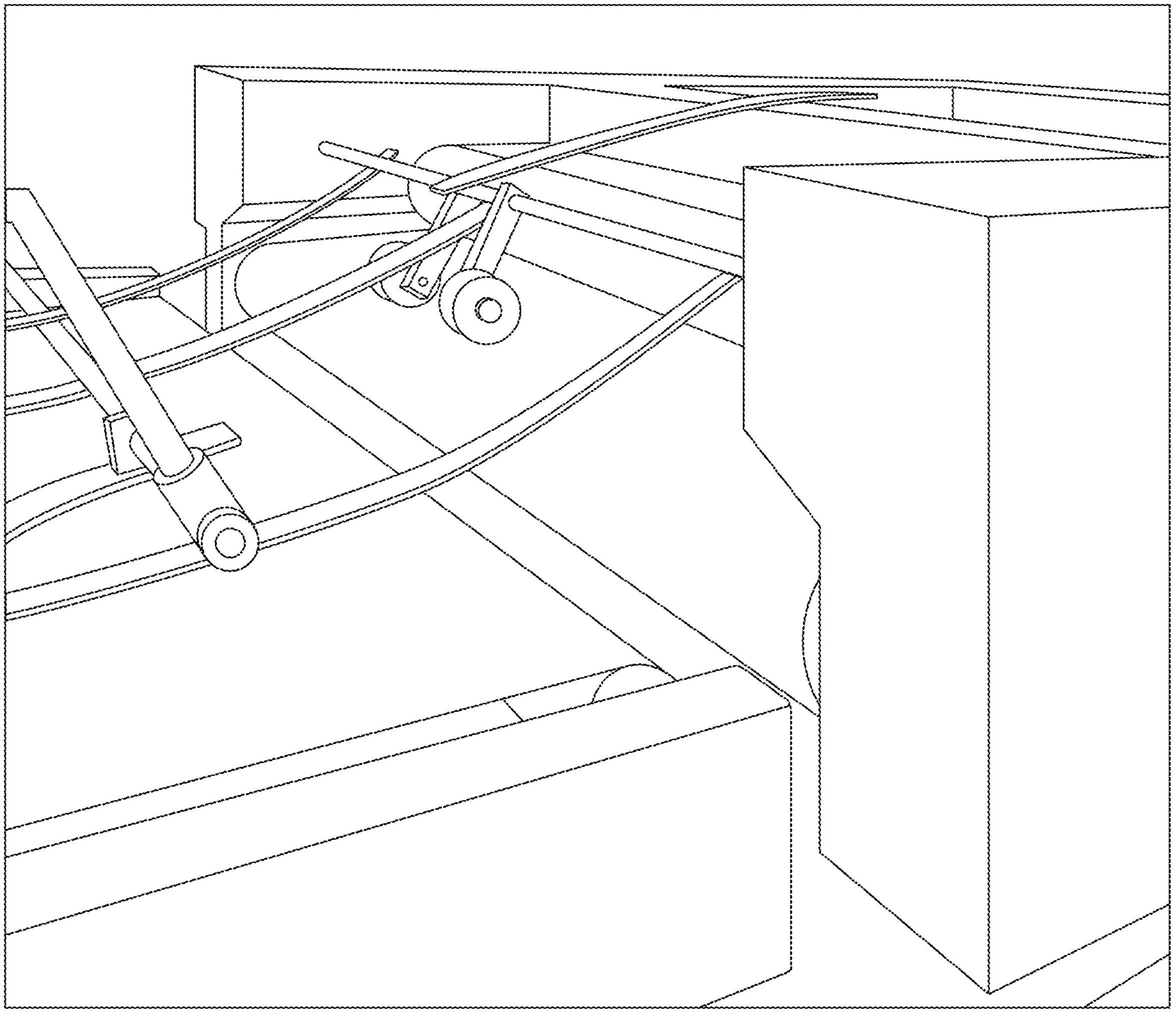
FIGS. 11A and 11B are perspective views of isolated segments shown in FIG. 1.
Figure 11B:
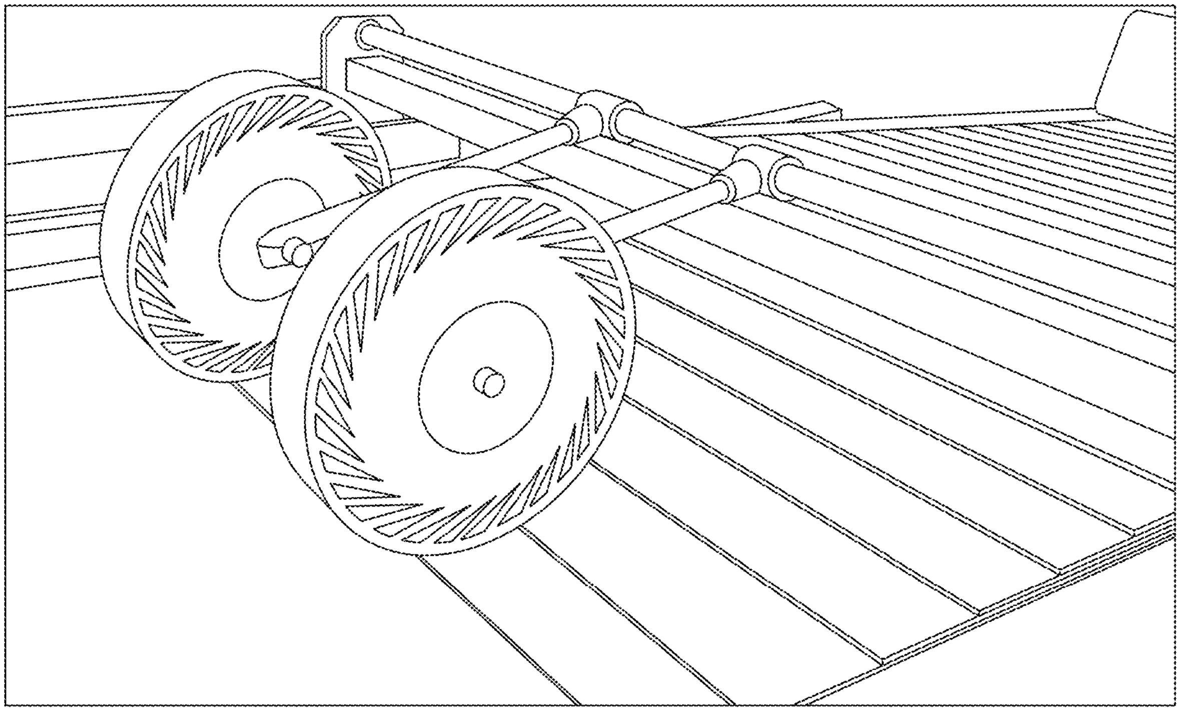

As introduced in FIGS. 1 and 2, the assembly may include a wet end 102, 104, 106, 108, and 110; a pre-print section 112; a central laminating section 114 and 116; and a delivery section 118. As illustrated in FIGS. 1-2, assembling the recyclable signage shown and described herein having a corrugated support includes conveying a medium along a longitudinal direction. In particular examples, the medium having a coated unactivated striped front face and an opposing coated unactivated striped rear face is conveyed through the wet-end of the conveying process, i.e. station 102, station 104, station 106, and station 108. As shown, the medium is conveyed through a corrugator. In particular examples, the corrougator includes at least one pair of heated drums that concurrently heat, i.e. thereby activate, the medium's stripes. The corrugator further crimps the medium to define a barrier. As shown in FIG. 6, the assembly then generates flute tips along the medium to define a fluted medium. In particular examples, the medium is then conveyed around a secondary heated drum to activate unactivated stripes, thereby creating a full wrap. Typically, a liner sheet is then conveyed along an asitrade in a direction adjacent the medium. In certain examples the liner sheet has activated elements and unactivated elements on a front side, as well as activated elements and unactivated elements on a rear side. However, alternative embodiments and examples include additional liner sheets, including activated elements and/or unactivated elements. The fluted medium is then adhered about the liner. Applicant has unexpectantly discovered advantages of a starch adhesive to adhere the fluted medium about the liner. In certain examples, the starch adhesive is treated along peaks and ridges of the fluted medium.

In some examples, the medium is conveyed through an asitrade heating, for instance Applicant has discovered improved activation during asitrade heating between about one hundred and seventy degrees to about one hundred and eighty degrees, to heat the stripes and penetrate the coating in-between the stripes. In this way, the asitrade heating encloses the penetrated stripes to produce the medium shown and described herein.

In certain examples, the coating may be devoid of activation until the strips are concurrently heated and activated, followed by downstream compressing the medium, the liner, and the adhesive. Further, the medium may have a bleached sheet and be coated prior to activating the stripes. For instance, the coated medium may have a plurality of heat-activated coatings, for instance for water repellant characteristics and the like. The method may include coating the medium prior to adhering the medium with the liner sheet. The method may include coating the liner sheet prior to adhering the medium with the liner sheet.

In some examples, the liner sheet may be conveyed through an asitrade for heating between about one hundred and fifty degrees to about one hundred and sixty degrees, or the like.

Figure 12:
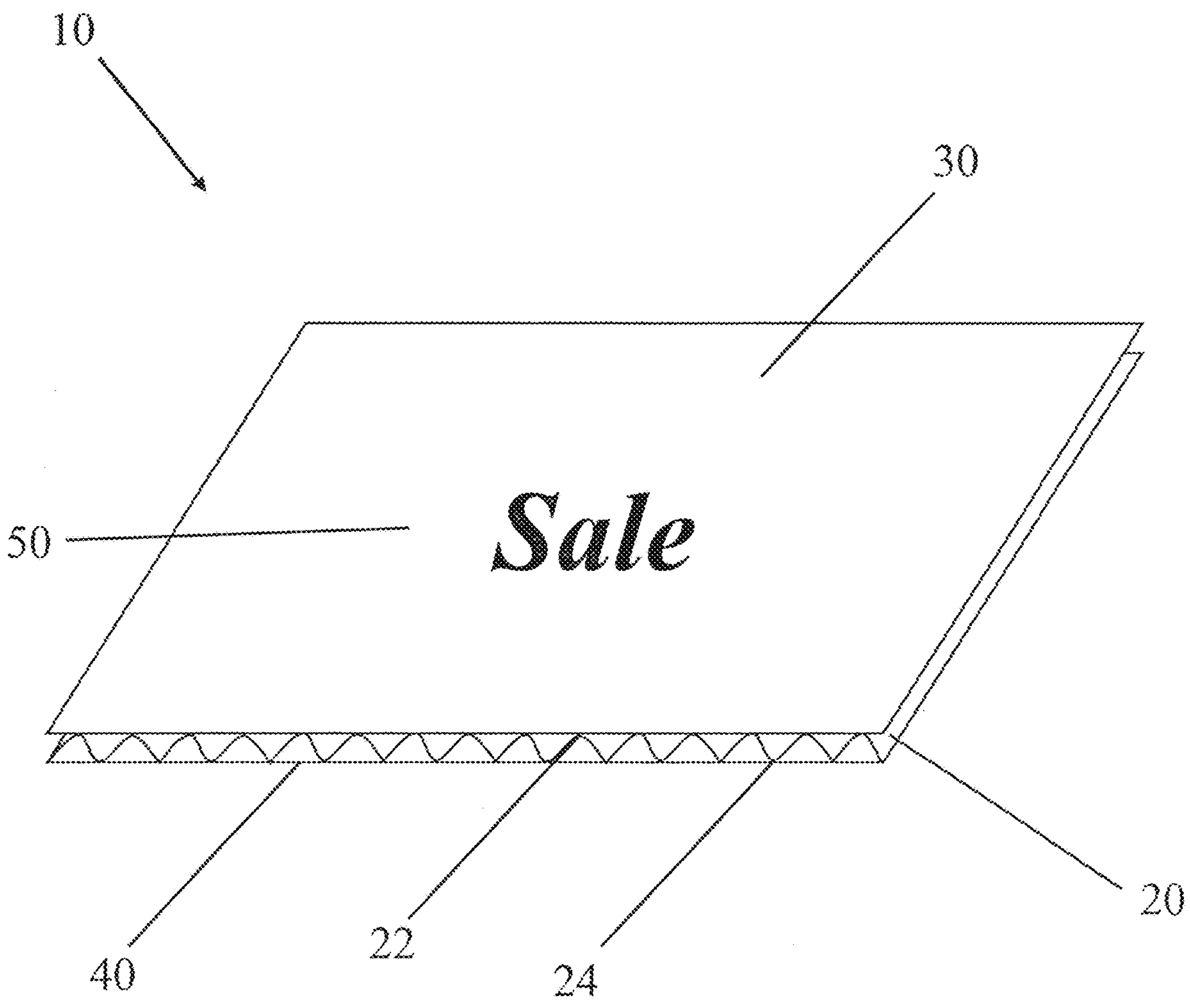
FIG. 12 is a perspective view of one embodiment of a signage medium according to the present disclosure.
Figure 13:
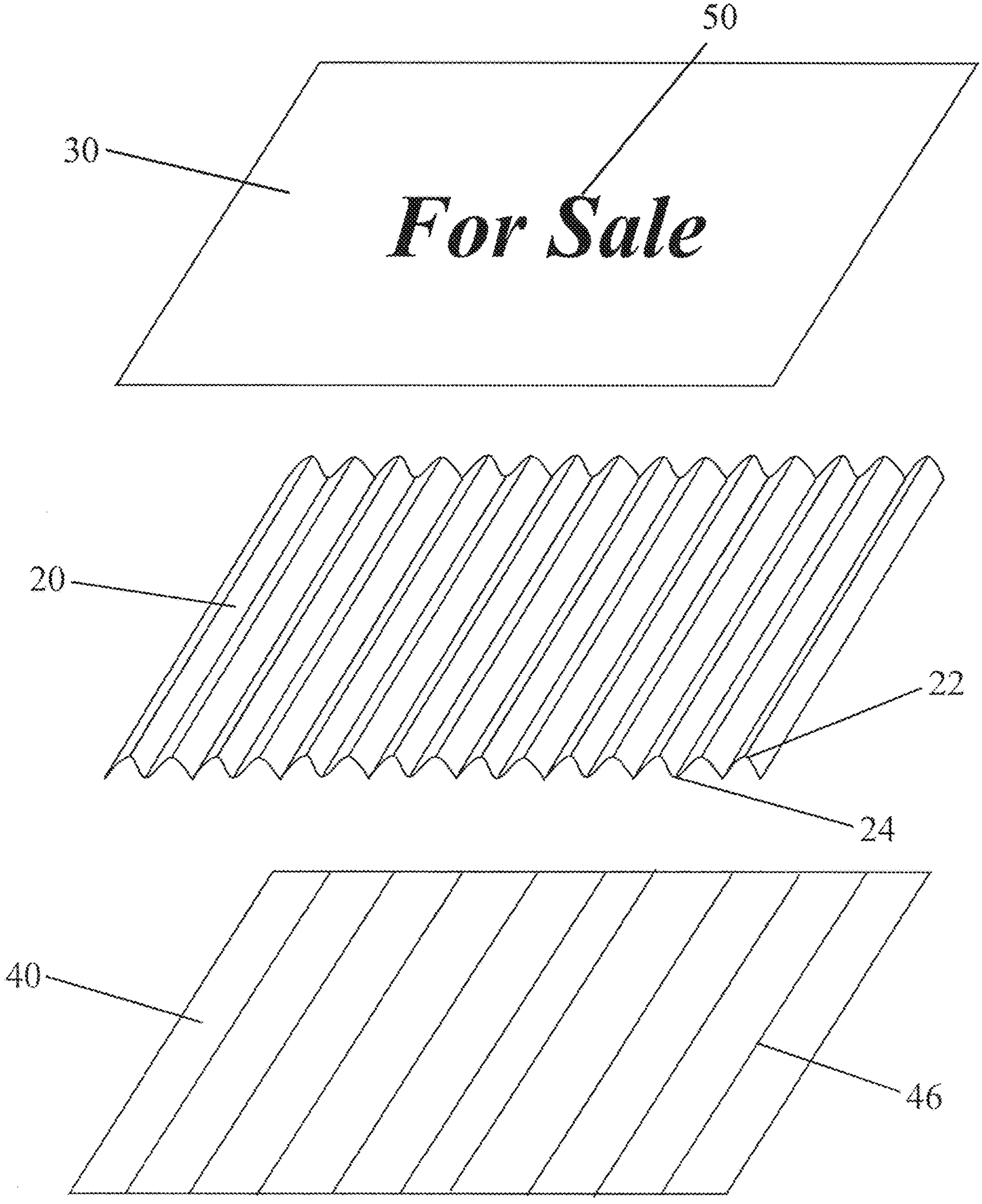
FIG. 13 is an exploded view of the embodiment introduced in FIG. 1.

In certain examples shown in FIGS. 12 and 13, the signage 10 produced by any of the processes and methods herein includes a care layer 20, a top liner 30, and a bottom liner 40. Top liner 30 and bottom liner 40 typically comprise magazine stock paper, but may be ofany other substantially flat material as understood by one skilled in the art having the benefit of this disclosure. As further described herein, the signage 10 includes a semi-impermeable coating to provide the structural integrity and characteristics suitable for printing shown and described herein.

As illustrated in the figures, the core layer 20 typically comprises a fluted corrugated sheet defined by a plurality of ridges. Each ridge has a peak and may be separated from a neighboring ridge with a trough. Core layer 20 has a first side and a second side. In particular examples, the peaks of the ridges are defined as crests 22 on the first side of core layer 20. The troughs 24 between the ridges define the peaks of the ridges on the second side of core layer 20. Core layer 20 may be of any flute size. In one example, core layer 20 is a B flute. In another example, core layer 20 is a C flute. Yet in another example, core layer 20 is an E flute. Still in other examples, core layer 20 is a non-fluted medium.

In particular examples, top liner 30 has an inner face and an outer face. Outer face is exposed facing away from core layer 20. Inner face includes an adhesive that binds to crests 22. In one example, the adhesive comprises polyvinyl alcohol. The adhesive may further include additives. In embodiments where core layer 20 comprises a non-fluted medium, then inner face may bind to at least a portion of first side of core layer 20.

Bottom liner 40 also comprises an inner face and an outer face 44. Outer face 44 is exposed facing away from core layer 20. Inner face includes an adhesive that binds to troughs. In one example, the adhesive comprises corn starch, or similar adhesive as understood by those skilled in the art having the benefit of this disclosure. The adhesives may further include additives. In embodiments where core layer 20 comprises a non-fluted medium, then inner face 42 may bind to at least a portion of second side 28 of core layer 20. As seen in FIG. 13, bottom liner 40 may further include striping 46 to provide enhanced connection between elements shown and described herein. In one particular example, the inner face 42 of bottom liner 40 includes striping 46.

One benefit for using a corrugated medium is recycling properties after use. Signage 10 also includes a semi-permeable coating that may serve to increase its stability when used outdoors; for instance, weatherproofing, withstanding humidity, wind, precipitation, and the like. Semi-permeable coating may comprise a wax alternative, such as FluteSHIELD™ coating, to retain improved recycling capabilities after use. Application of semi-permeable coating may give signage 10 various Cobb values.

In one embodiment, the semi-permeable coating is applied to outer faces 34 and 44 of top liner 30 and bottom liner 40, respectively. In another embodiment, the semi-permeable coating is applied to both faces of top liner 30 and bottom liner 40. Core layer 20 may also include a semi-permeable coating. In one example, the semi-permeable coating is applied to at least a portion of either the first side 26 or second side 28. In another example, the semi-permeable coating is applied to both sides of core layer 20.

The semi-permeable coating may be applied before, during, or after application of any adhesive to any layer. More than one type of semi-permeable coating may be applied on one or more layers of signage 10. Signage 10 may also include additional coatings, such as a SurfSHIELD™ coating. For example, signage 10 may include SurfSHIELD™ SuperCobb as an additional coating. These additional coatings may be used to modify any characteristic of signage 10, such as its Cobb value or color.

Semi-permeable coatings may interact with one or more adhesives used to adhere core layer 20 onto top liner 30 and bottom liner 40. For example, the semi-permeable coating may form chemical bonds with a polyvinyl alcohol adhesive used to adhere the top liner 30 onto core layer 20. In another example, the semi-permeable coating may form chemical bonds with a corn starch adhesive used to adhere the bottom liner 40 onto core layer 20. Various additives may be included with one or more adhesives to strengthen the bonding between the adhesive and semi-permeable coating.

In operation, signage 10 typically includes one or more graphics 50 printed on an outer face. Graphics 50 may comprise text, icons, images, or a combination thereof. Applicants have unexpectedly discovered the systems shown and described herein enhance the ability of signage 10 to receive graphics 50. Certain embodiments of the present inventions may be adapted to receive print being free of a clay coating. For example, top liner 30 and bottom liner 40 may comprise magazine stock paper with graphics 50 printed in the absence of a clay coating. Graphics 50 may be printed using a solvent-based ink. More than one solvent-based ink may be used to print graphics 50. In other examples, top liner 30 and bottom liner 40 may include a clay coating with graphics 50 printed on top. Alternatively, other coatings may be used to prime outer faces 34, 44 for printing. Clay coatings or other priming coats may also be used with top liner 30 and bottom liner 40 without a graphic 50 printed.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Certain modifications and improvements will occur to those skilled in the art upon a reading of the foregoing description. By way of example, the present disclosures may be applied to corrugated mediums other than those having a single wall. For instance, the corrugated medium may comprise a double or triple wall board. It should be understood that all such modifications and improvements have been deleted herein for the sake of conciseness and readability but are properly within the scope of the following claims.

What is claimed is:

1. A layered outdoor signage consisting of:

a. a corrugated medium having a plurality of ridges;

b. a first layer liner adjacent said corrugated medium, wherein said first layer liner having a moisture barrier and a graphic print;

c. a polyvinyl acetate adhesive binding said first layer liner and said corrugated medium;

d. a second layer liner adjacent said corrugated medium, wherein said second layer liner having a moisture barrier and a graphic print; and e. a starch adhesive binding said second layer liner and said corrugated medium.

2. The signage in claim 1, wherein said signage being repulpable and recyclable.

3. The signage in claim 1, wherein said signage comprises two opposing printable exterior surfaces.

* * * * *